May 24, 1966   W. E. MOODY   3,252,304
YIELDABLE DRIVE CONNECTION FOR LAWN MOWERS AND THE LIKE
Filed Oct. 28, 1963   2 Sheets-Sheet 1
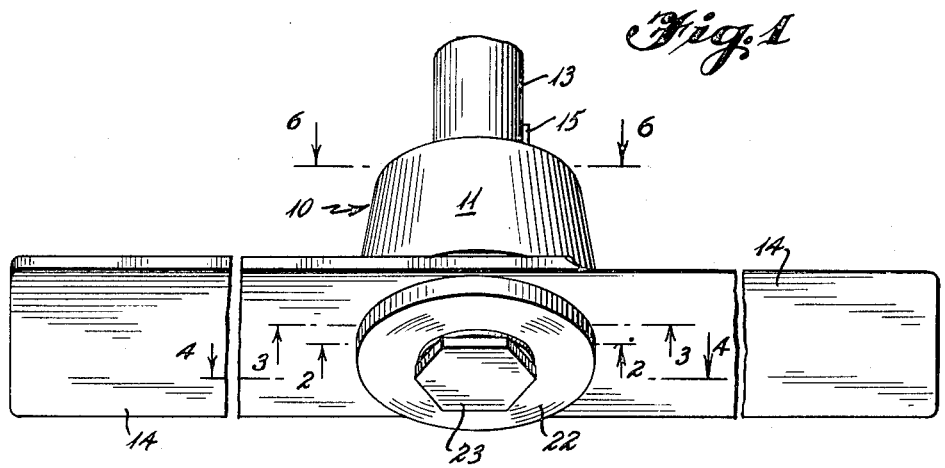
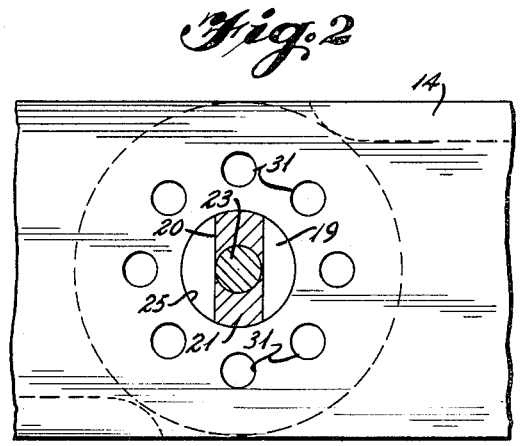
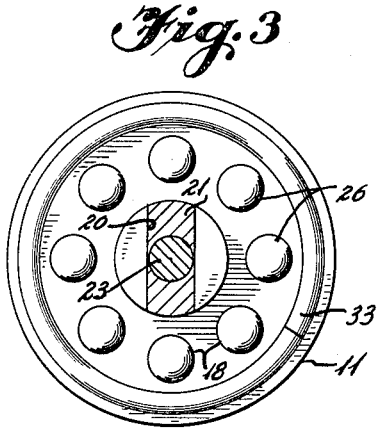
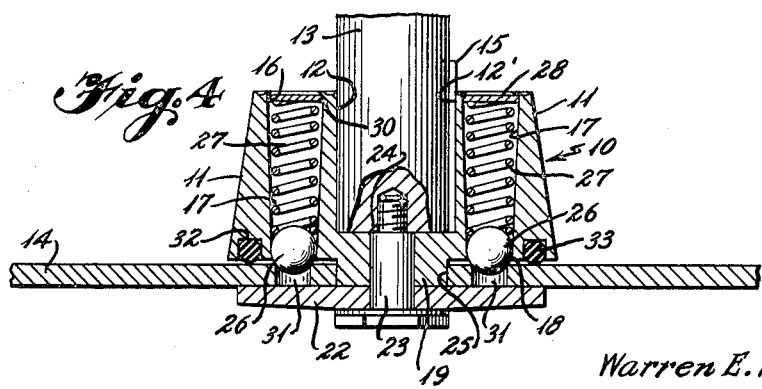
INVENTOR
Warren E. Moody
BY
ATTORNEY May 24, 1966 W. E. MOODY 3,252,304
YIELDABLE DRIVE CONNECTION FOR LAWN MOWERS AND THE LIKE
Filed Oct. 28, 1963 2 Sheets-Sheet 2

INVENTOR
Warren E. Moody
BY
ATTORNEY

United States Patent Office 3,252,304
Patented May 24, 1966

3,252,304
YIELDABLE DRIVE CONNECTION FOR LAWN MOWERS AND THE LIKE
Warren E. Moody, 95 Fiesta Way, Fort Lauderdale, Fla.
Filed Oct. 28, 1963, Ser. No. 319,451
3 Claims. (Cl. 64—29)

This invention relates to a yieldable drive connection and to a method of assembly thereof for two relatively movable parts and more particularly to such a connection between the drive shaft of a motor driven rotary lawn mower and the cutting blade somewhat after the manner shown in my prior U.S. Patent No. 2,978,858, issued April 11, 1961.

In the manufacture of the device according to the prior patent, aforesaid, manufacture and assembly, costs and problems were encountered which rendered it difficult to produce as there shown and in the quantities required, devices having the desired uniformity in function and operation. Hence the present invention has overcome the noted difficulties and has produced a commercially, successful device of the type described having the improved properties and which is therefore, far simpler to assemble.

An object of this invention, therefore, is the production of a yieldable drive connection of the type described which is easily assembled as a unit.

Another object of this invention is the production of a yieldable drive connection of the type described wherein the yieldable driving members are retained in a driving head to engage the cutter bar with substantially uniform force.

A further object of this invention is the production of a driving head in which a plurality of yieldable driving members are held under substantially uniform force by a single retainer plate.

Still another object of this invention is the provision of a method of assembly of the driving head of a yieldable drive connection.

These and other objects will become apparent as the following specification proceeds, which specification when taken with the accompanying drawings forms a complete disclosure of my invention.

In the drawings, wherein like parts are represented by like characters of reference:

FIG. 1 is a perspective bottom view of the device of this invention, with the attached cutter blade;

FIG. 2 is a horizontal section substantially on the line 2—2 of FIG. 1, looking in the direction of the arrows;

FIG. 3 is a horizontal section substantially on the line 3—3 of FIG. 1, looking in the direction of the arrows;

FIG. 4 is a vertical section taken substantially on the line 4—4 of FIG. 1, showing the operative position of the connecting device;

Figure 5:
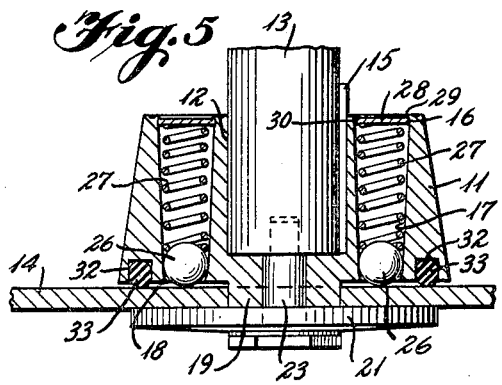
FIG. 5 is a view similar to FIG. 4 showing the yielding connection as if the cutter blade had struck an obstruction.
Figure 6:
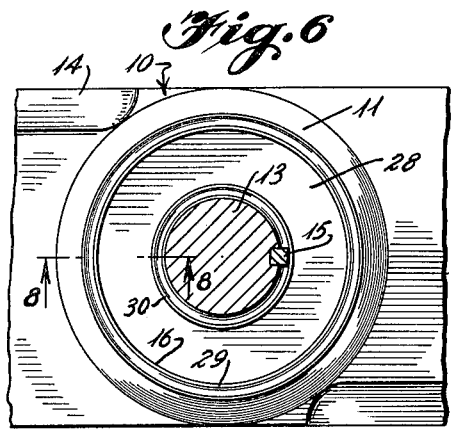
FIG. 6 is a plan view of the device.
Figure 7:
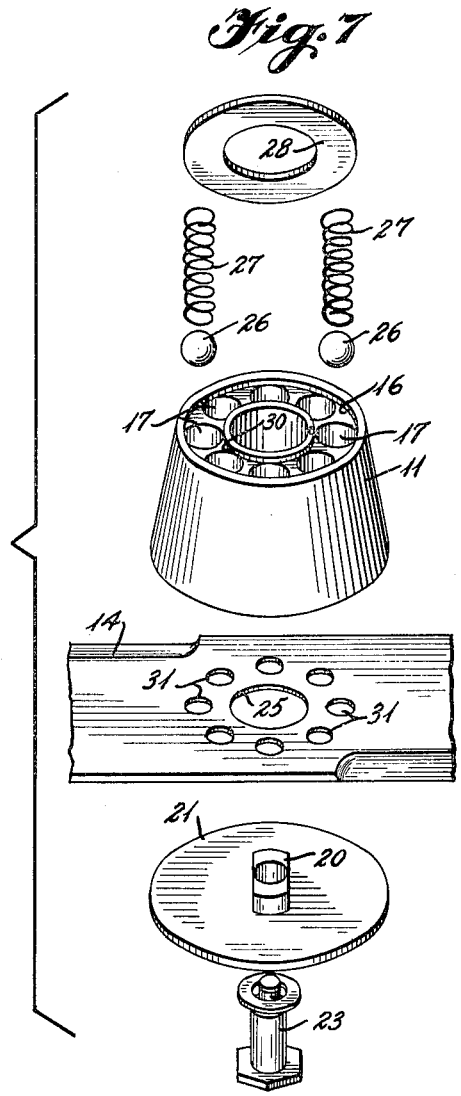
FIG. 7 is an isometric exploded view.
Figure 8:
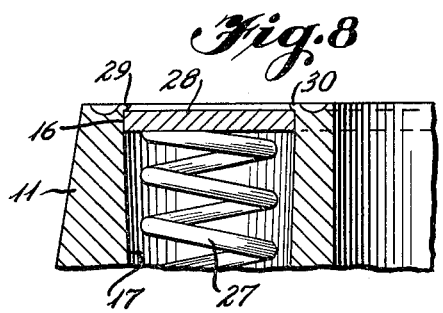
FIG. 8 is a vertical section substantially on the line 8—8 of FIG. 6.

Referring now to FIGS. 1 to 8, the device of this invention is indicated as a whole by the numeral 10, and comprises generally a housing or block having a generally circular cross section. An axial passage 12 is bored or drilled part way through the housing to receive a drive shaft 13 which may be the shaft of a suitable prime mover or a shaft suitably connected to such prime mover. A keyway 12' is formed in the passage 12 to receive a key 15 on the drive shaft 13. The housing 11 is provided at its upper end with an annular seat 16 for a purpose later to appear.

An annular series of axially directed openings or holes 17 is formed in the housing 11 during the casting operation. These holes 17 are shown as being slightly tapered. This taper serves no purpose other than to permit withdrawal of the molding core. A slightly inturned lip 18 is formed at the bottom of each hole for a purpose later to appear.

The lower end of the housing or block 11 is provided with a cylindrical boss 19 having a transverse slot 20 adapted to engage a transverse key 21 on the washer 22 which holds a blade 14 on the housing 11 by means of the washer, a bolt 23 threaded into the shaft 13 and having a flange 24 engaging the lower end of said shaft. The blade 14 has an opening 25 adapted to fit freely on the boss 19, and is free for rotation about said boss.

To couple the blade 14 for rotation with the shaft 13, I provide balls 26 in the holes 17 which project slightly less than radial distance through the holes 17 and normally rest on the lips 18. Above the balls 26, I place helical springs 27 which are retained in the holes 17, under high compression, by means of an annular washer 28. The washer 28 is retained on the annular seat 16 by having some of the metal of the block spun over the edge of the washer 28 as at 29 and 30, shown best in FIG. 8. The blade 14 is provided with an annular series of ball seat-type opening 31, in vertical alignment with the holes 17 and equal in number. In normal use, as shown in FIG. 4, the balls 26 project into the openings 31 to cause the blade 14 to rotate with the shaft 13. Should the blade 14 encounter an object or obstruction, which could cause serious damage to a rigid blade, it will periodically de-clutch as in FIG. 5. The noise made by the clutching and de-clutching would alert an operator to trouble and he would stop the prime mover until the obstruction was removed.

In order to prevent entry of dirt or any damaging foreign matter into the area of the clutching elements surrounding the central boss 19, an annular groove 32 is provided in the lower face or end of the housing 11, in which a suitable elastomeric seal 33 is placed, so that it projects from and yieldably engages the upper face of the blade 14 circumferentially of the hub 19 and outwardly of the annular series of ball seat-type openings.

Figure 9:
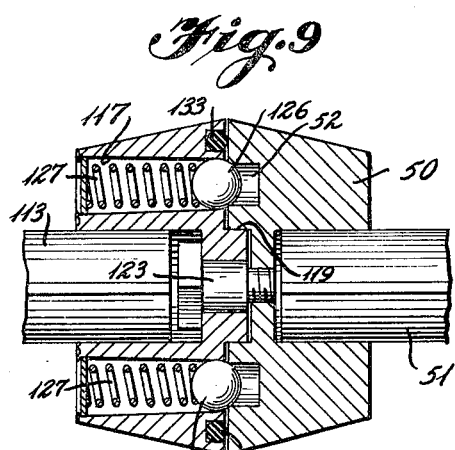
FIG. 9 is a vertical section of a slightly modified form of the device for yieldingly connecting a motor or other drive shaft to a horizontal driven shaft.

A modification is shown in FIG. 9, as a coupling 110 in which the housing 111 is like the housing 11 and has openings 117, compression springs 127, balls 126 and seal 133. The housing 111 is keyed or otherwise connected to a shaft 113 for rotation therewith. A complementary coupling member 50, of size and shape similar to the housing 11, is keyed or otherwise connected for rotation with the shaft 51. Member 50 is provided with an annular series of depressions 52 in axial alignment with the openings 117 and equal in number therewith. The member 50 is rotatably retained on the housing 111 by means of a bolt 123. The coupling is normally operative as shown in FIG. 9. However, should the load on the shaft 51 be greater than the torque provided by the shaft 113, the coupling will periodically disengage and engage, as described for the blade 14 and the housing 11, with noise which would alert an operator to trouble.

Having now described my invention in certain preferred forms, I desire it to be understood that modifications and changes may be made within the skill of the art and the scope of the appended claims.

I claim:

1. A yieldable drive connection for coupling the drive shaft of a motor driven rotary lawn mower to the cutter blade thereof, said connection comprising a block having a generally circular cross section and an axial opening to accommodate the drive shaft, a plurality of openings in said block annularly arranged about the axis of said drive shaft, each opening having a slight lip at its lower end, balls in said openings projecting less than radius distance below said balls, springs above said block under compression, an annular space in the upper end of said block, a retaining annulus in said space, holding said springs under compression on said balls inturned lips formed of metal spun from said block over the edge of said space and engaging the inner and outer rims of said annulus to positively secure said annulus in said space at a predetermined depth therein, a hub on one end of the block, and a cutter blade having a plurality of annularly arranged openings in axial alignment with the openings in the block mounted on the hub, the balls in the block projecting into the openings in the blade, whereby said balls yield upon engagement of said cutter blade with an obstruction to stop rotation of said blade.

2. The structure defined by claim 1 in which an annular elastomeric seal projects from the lower face of said block into engagement with said blade outwardly of said annularly arranged seat-type openings therein.

3. The structure defined by claim 1 in which an annular groove is formed in the lower face of said block surrounding said ball carrying openings, and an elastomeric O-ring seated in said groove and engaging said blade outwardly of said annularly arranged seat-type openings therein.

References Cited by the Examiner

UNITED STATES PATENTS

| | | | |
|---|---|---|---|
| 1,575,637 | 3/1926 | Neth | 64—30 |
| 1,611,940 | 12/1926 | Ohmer | 64—29 |
| 2,146,153 | 2/1939 | Mathewson | 64—27 |
| 2,269,429 | 1/1942 | Brenkert | 287—53 |
| 2,862,376 | 12/1958 | Thelander | 64—30 |
| 2,871,681 | 3/1959 | Beecher | 64—9 |
| 2,903,868 | 9/1959 | Stillwagon | 64—17 |
| 2,978,858 | 4/1961 | Moody | 56—295 |
| 3,050,923 | 8/1962 | Sanderson | 64—29 X |

FOREIGN PATENTS 260,447    9/1928    Italy.

BROUGHTON G. DURHAM, *Primary Examiner.*

HALL C. COE, *Assistant Examiner.*